US011402666B2

(12) United States Patent
Iwasaki et al.

(10) Patent No.: US 11,402,666 B2
(45) Date of Patent: Aug. 2, 2022

(54) SPECTACLE LENS AND SPECTACLES

(71) Applicant: HOYA LENS THAILAND LTD., Pathumthani (TH)

(72) Inventors: Eisaku Iwasaki, Tokyo (JP); Yoichi Ogo, Tokyo (JP); Keiji Nishimoto, Tokyo (JP); Kenji Takashiba, Prachatipat (TH); Naomi Ogawa, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 0 days.

(21) Appl. No.: 15/519,686

(22) PCT Filed: Oct. 16, 2015

(86) PCT No.: PCT/JP2015/079354
§ 371 (c)(1),
(2) Date: Apr. 17, 2017

(87) PCT Pub. No.: WO2016/060257
PCT Pub. Date: Apr. 21, 2016

(65) Prior Publication Data
US 2017/0242273 A1 Aug. 24, 2017

(30) Foreign Application Priority Data
Oct. 17, 2014 (JP) .............................. JP2014-212988

(51) Int. Cl.
*G02C 7/10* (2006.01)
*G02B 1/14* (2015.01)
*G02B 5/28* (2006.01)

(52) U.S. Cl.
CPC .............. *G02C 7/104* (2013.01); *G02B 1/14* (2015.01); *G02B 5/28* (2013.01); *G02C 7/10* (2013.01); *G02C 7/107* (2013.01); *G02C 2202/16* (2013.01)

(58) Field of Classification Search
CPC .......... G02C 7/10; G02C 7/104; G02C 7/105; G02C 7/107; G02C 2202/16; G02C 7/02–108; G02B 1/04; G02B 1/041; G02B 1/10; G02B 1/105; G02B 1/11; G02B 1/113; G02B 1/115; G02B 1/116; G02B 1/14; G02B 1/18; G02B 5/20; G02B 5/208; G02B 5/26; G02B 5/28; G02B 5/283; G02B 5/285; C08L 83/08; B05D 5/06
USPC .......... 359/159.62, 601; 427/164; 351/159.6, 351/159.62, 159.65
See application file for complete search history.

(56) References Cited

U.S. PATENT DOCUMENTS

| 4,070,097 | A | * | 1/1978 | Gelber | G02B 1/116 |
|---|---|---|---|---|---|
| | | | | | 351/44 |
| 2002/0024705 | A1 | | 2/2002 | Nakano | |
| 2013/0222913 | A1 | * | 8/2013 | Tomoda | C23C 14/24 |
| | | | | | 427/164 |
| 2014/0268031 | A1 | | 9/2014 | Ambler | |
| 2014/0347625 | A1 | * | 11/2014 | Tomoda | G02B 1/115 |
| | | | | | 351/159.01 |
| 2015/0234209 | A1 | * | 8/2015 | Miyamoto | G02B 1/041 |
| | | | | | 427/595 |

FOREIGN PATENT DOCUMENTS

| EP | 1 174 734 A2 | 1/2002 |
|---|---|---|
| EP | 2 775 341 A1 | 9/2014 |
| EP | 2 902 817 A1 | 8/2015 |
| JP | 2002-031701 A | 1/2002 |
| JP | 2012-093689 A | 5/2012 |
| JP | 2013-097160 A | 5/2013 |
| WO | 2013/122253 A1 | 8/2013 |
| WO | 2014/050930 A1 | 4/2014 |

OTHER PUBLICATIONS

Jan. 19, 2016 International Search Report issued in International Patent Application No. PCT/JP2015/079354.
Apr. 18, 2017 International Preliminary Report on Patentability issued in International Patent Application No. PCT/JP2015/079354.
Nov. 1, 2017 Office Action issued in Australian Patent Application No. 2015331263.
Jan. 23, 2018 Office Action issued in Canadian Patent Application No. 2,964,444.
Feb. 6, 2018 Office Action issued in Japanese Patent Application No. 2016-554140.
Apr. 20, 2018 Office Action issued in Korean Patent Application No. 10-2017-7013083.
Apr. 26, 2018 Extended Search Report issued in European Patent Application No. 15850996.8.
Oct. 31, 2018 Office Action issued in Chinese Application No. 201580056322.0.
Jul. 1, 2019 Office Action issued in Chinese Patent Application No. 201580056322.0.
Jan. 3, 2020 Office Action issued in Chinese Patent Application No. 201580056322.0.

* cited by examiner

*Primary Examiner* — Nicholas R. Pasko
(74) *Attorney, Agent, or Firm* — Oliff PLC

(57) ABSTRACT

A spectacle lens including a lens base material and a multilayer film provided on each surface of an eyeball-side surface and an object-side surface of the lens base material, in which a normal incidence mean reflectance $R_{eye}$ in a wavelength range of 430 to 450 nm measured on the eyeball-side surface of the spectacle lens and a normal incidence mean reflectance $R_{object}$ in a wavelength range of 430 to 450 nm measured on the object-side surface of the spectacle lens each are more than 0%, and $R_{eye}$ is greater than $R_{object}$.

9 Claims, No Drawings

SPECTACLE LENS AND SPECTACLES

CROSS-REFERENCE TO RELATED APPLICATION

This application is based upon and claims the benefit of priority from Japanese patent application No. 2014-212988, filed on Oct. 17, 2014, the disclosure of which is incorporated herein in its entirety especially by reference.

TECHNICAL FIELD

The present disclosure relates to a spectacle lens and spectacles equipped with the spectacle lens.

BACKGROUND ART

In recent years, monitor screens of digital devices have migrated from cathode-ray tubes to liquid crystals and recently to LED liquid crystals. However, liquid crystal monitors, especially LED liquid crystal monitors, intensely emit short-wavelength light of approximately 430 to 450 nm, called blue light. Thus, in order to effectively mitigate asthenopia or ocular pain due to long time use of digital devices, it is desirable to take measures against blue light. Note that, blue light is light having the wavelength of 430 to 450 nm in the following description.

In this regard, JP 2012-093689 A or its English family member US 2013/222913 A1, the disclosure of which is incorporated herein in its entirety especially by reference, proposes an optical product including a multilayer film having a characteristic of reflecting light having the wavelength of 400 to 450 nm including the wavelength range of blue light.

SUMMARY

As measures against blue light, by imparting a characteristic of reflecting blue light (hereinafter, also referred to as a "blue light reflective characteristic") to a spectacle lens surface, the amount of blue light entering the eyes of a wearer is reduced through the spectacle lens, and which can mitigate the burden of blue light on the eyes.

On the other hand, the spectacle lens is required to be usable by a wearer of spectacles with a good wearing feeling. The inventors have found, from their studies, that the spectacle lens to which the blue light reflective characteristic is imparted does not always have a good wearing feeling and further improvement is desired.

An aspect of the present disclosure is to provide a spectacle lens capable of mitigating the burden of blue light on the eyes and having a good wearing feeling.

The inventors made intensive studies to achieve the above aspect and have acquired the following new knowledge.

JP 2012-093689 A discloses that a multilayer film is provided to impart a blue light reflective characteristic to each surface of a spectacle lens. It is effective to provide the multilayer film to impart the blue light reflective characteristic to each surface of the spectacle lens in mitigating the burden of the blue light on the eyes.

However, light entering the eyes of a wearer of spectacles is not limited to the incident light from the object-side surface, and the light diagonally entering the eyeball-side surface of the lens from the rear side also enters the eyes of the wearer as reflection light from the eyeball-side surface. The reflection light from the eyeball-side surface includes, in addition to the light reflected on the eyeball-side surface, the light incident from the eyeball side, reflected on the object-side surface, and emitted from the lens as return light. Here, the inventors concluded that, with the spectacle lens in which a higher blue light reflective characteristic is imparted to the object-side surface than the eyeball-side surface, glare was caused because the blue light reflected on the different surfaces entered the eyes, and which contributed to deterioration of the wearing feeling.

Then, as a result of further studies based on the above knowledge, the inventors have newly found a spectacle lens including a lens base material and a multilayer film provided on each surface of an eyeball-side surface and an object-side surface of the lens base material, in which a normal incidence mean reflectance $R_{eye}$ in a wavelength range of 430 to 450 nm measured on the eyeball-side surface of the spectacle lens and a normal incidence mean reflectance $R_{object}$ in a wavelength range of 430 to 450 nm measured on the object-side surface of the spectacle lens each are more than 0%, and $R_{eye}$ is greater than $R_{object}$ and completed an aspect of the present disclosure. As described above, by imparting a higher blue light reflective characteristic to the eyeball-side surface than the object-side surface, it is possible to suppress occurrence of glare.

Another aspect of the present disclosure relates to spectacles including the spectacle lens and a frame equipped with the spectacle lens.

According to the present disclosure, it is possible to provide a spectacle lens which mitigates the burden of blue light on the eyes and has a good wearing feeling, and spectacles equipped with the spectacle lens.

DESCRIPTION OF EMBODIMENTS

A spectacle lens according to the present disclosure is a spectacle lens including a lens base material, and a multilayer film provided on each surface of an eyeball-side surface and an object-side surface of the lens base material, in which a normal incidence mean reflectance $R_{eye}$ in a wavelength range of 430 to 450 nm measured on the eyeball-side surface of the spectacle lens and a normal incidence mean reflectance $R_{object}$ in a wavelength range of 430 to 450 nm measured on the object-side surface of the spectacle lens each are more than 0%, and $R_{eye}$ is greater than $R_{object}$.

The spectacle lens is described below in more detail.

In the spectacle lens, the normal incidence mean reflectance $R_{eye}$ in the wavelength range of 430 to 450 nm measured on the eyeball-side surface and the normal incidence mean reflectance $R_{object}$ in the wavelength range of 430 to 450 nm measured on the object-side surface each are more than 0%. In other words, the eyeball-side surface and the object-side surface of the spectacle lens each have a characteristic of reflecting incident light having the wavelength range of 430 to 450 nm (a blue light reflective characteristic). $R_{eye}$ and $R_{object}$ each may be equal to or more than 1.00%, may be equal to or more than 2.00%, and may be equal to or more than 3.00%. As the normal incidence mean reflectance becomes higher, the burden of blue light on the eyes can be reduced more. On the other hand, since bluishness in the spectacle lens likely becomes stronger as the normal incidence mean reflectance becomes higher, $R_{eye}$ and $R_{object}$ each may be less than or equal to 21.00% from the perspective for obtaining a less-bluish spectacle lens, and at least either of or both of $R_{eye}$ or/and $R_{object}$ may be less than 15.00%, may be less than or equal to 11.00%, may be less than or equal to 10.00%, may be less than or equal to 9.00%, and may be less than or equal to 8.00% from the perspective for providing a spectacle lens having a better wearing feeling. Note that, the normal incidence mean reflectance means the arithmetic mean value of the normal incidence reflectance in the wavelength range of 430 to 450 nm measured for each arbitrary wavelength (with an arbitrary pitch) at the optical center of a surface to be measured. For the measurement, the measurement wavelength interval (pitch) can be arbitrarily set in the range of, for example, 1 nm to 10 nm.

In the spectacle lens, the normal incidence mean reflectance $R_{eye}$ in the wavelength range of 430 to 450 nm on the eyeball-side surface is greater than the normal incidence mean reflectance $R_{object}$ in the wavelength range of 430 to 450 nm on the object-side surface. As described above, by imparting a higher blue light reflective characteristic to the eyeball-side surface, it is possible to suppress the occurrence of glare or to reduce the degree of occurrence. Thus, it is possible to achieve both mitigation of the burden of blue light on the eyes and a good wearing feeling. From the perspective for obtaining a better wearing feeling, $R_{eye}$ may be equal to or more than ($R_{object}$+0.90) %, that is, the difference between $R_{eye}$ and $R_{object}$ ($R_{eye}$−$R_{object}$) is equal to or more than 0.90%, may be equal to or more than 1.00%, may be equal to or more than 2.00%, and may be equal to or more than 3.00%. Furthermore, the difference may be, for example, less than or equal to 7.00% or less than or equal to 6.00%, but may be more than 7.00% or more than 6.00%. For example, the difference may be less than or equal to 18.00%, less than or equal to 12.00%, or the like. Furthermore, the ratio of $R_{eye}$ to $R_{object}$ ($R_{eye}$/$R_{object}$) may be more than 1.00 and less than or equal to 6.50, may be more than 1.00 and less than or equal to 5.00, and may be equal to or more than 1.20 and less than or equal to 5.00.

In the spectacle lens, the multilayer film provided on each surface of the eyeball-side surface and the object-side surface of the lens base material can impart the blue light reflective characteristic to the spectacle lens. Note that, in the present disclosure, the eyeball-side surface is a surface disposed at the eyeball side when a wearer wears spectacles equipped with the spectacle lens of the present disclosure, and the object-side surface is a surface disposed at the object side. The multilayer film is provided on the surface of the lens base material directly or indirectly through one or more other layers. The lens base material is not specifically limited, and can be styrene resin including (meth) acrylic resin, polycarbonate resin, allyl resin, allyl carbonate resin such as diethyleneglycol bis (allylcarbonate) resin (CR-39), vinyl resin, polyester resin, polyether resin, urethane resin obtained through reaction between an isocyanate compound and a hydroxy compound such as diethylene glycol, thiourethane resin obtained through reaction between an isocyanate compound and a polythiol compound, transparent resin obtained by curing a polymerizable composition containing a (thio) epoxy compound having one or more intermolecular disulfide bonds, or the like. Furthermore, inorganic glass may be used. Note that, the lens base material may not be dyed (hereinafter, referred to as a clear lens) or may be dyed (a dyed lens). The refractive index of the lens base material is, for example, approximately 1.60 to 1.75. However, the refractive index of the lens base material is not limited to the above, and may be within the above range, or over or under the above range. Note that, the refractive index is the refractive index ne to the e-line (wavelength 546.07 nm).

The spectacle lens may be various lenses, such as a monofocal lens, a multifocal lens, or a progressive power lens. A type of the lens is determined based on the shapes of both surfaces of the lens base material. Furthermore, the lens base material surface may be a convex surface, a concave surface, or a flat surface. In a common lens base material and spectacle lens, the object-side surface is a convex surface, and the eyeball-side surface is a concave surface. However, the present disclosure is not limited to the above.

The multilayer film for imparting the blue light reflective characteristic may be provided on the lens base material surface directly or indirectly through one or more other layers. A layer which can be formed between the lens base material and the multilayer film is, for example, a hard coat layer. By providing a hard coat layer, it is possible to impart flaw resistance (abrasion resistance) to the spectacle lens and to improve durability (strength) of the spectacle lens. With regard to the details of the hard coat layer, for example, the paragraphs 0025 to 0028 and 0030 of JP 2012-128135 A can be referred to. Furthermore, a primer layer may be formed between the lens base material and the coat to enhance adhesion. With regard to the details of the primer layer, for example, the paragraphs 0029 to 0030 of JP 2012-128135 A can be referred to.

The multilayer film provided on each surface of the eyeball-side surface and the object-side surface of the lens base material is not specifically limited as long as the one which can impart a characteristic of reflecting incident light having the wavelength range of 430 to 450 nm (the blue light reflective characteristic) to the spectacle lens surface having the multilayer film. Such a multilayer film may be formed by sequentially laminating a high refractive index layer and a low refractive index layer. More specifically, the multilayer film can be formed by determining the film thickness of each layer through optical simulation by a known method based on a refractive index of a film material for forming the high refractive index layer and the low refractive index layer and the wavelength of light to be reflected, i.e. blue light, and then sequentially laminating the high refractive index layer and the low refractive index layer under film formation conditions determined such that the determined film thickness is achieved. The film forming material may be an inorganic material, an organic material, or an organic-inorganic composite material, and may be an inorganic material from the perspective of film formation and ease of availability. Furthermore, $R_{eye}$ measured on the eyeball-side surface and $R_{object}$ measured on the object-side surface each can be controlled to a desired value by adjusting the type, the film thickness, the laminating order, or the like of the film forming material.

A high refractive material for forming the high refractive index layer can be oxide selected from the group consisting of $ZrO_2$, $Ta_2O_5$, $TiO_2$, $Al_2O_3$, $Y_2O_3$, $HfO_2$, and $Nb_2O_5$. On the other hand, a low refractive index material for forming the low refractive index layer can be $SiO_2$ or $MgF_2$. Note that, oxide and fluoride are expressed here in a stoichiometric composition for convenience, but oxide or fluoride in which oxygen or fluorine is deficient or excessive as compared to the stoichiometric composition may also be used as a high refractive index material or a low refractive index material.

The film thickness of each layer included in the multilayer film can be determined through optical simulation as described above. A layer configuration of the multilayer film can be, for example, a configuration in which, a first layer (low refractive index layer), a second layer (high refractive index layer), a third layer (low refractive index layer), a fourth layer (high refractive index layer), a fifth layer (low refractive index layer), a sixth layer (high refractive index layer), and a seventh layer (low refractive index layer) are laminated in this order from the lens base material to the outermost side of the lens, a configuration in which a first layer (high refractive index layer), a second layer (low refractive index layer), a third layer (high refractive index layer), a fourth layer (low refractive index layer), a fifth layer (high refractive index layer), and a sixth layer (low refractive index layer) are laminated in this order from the lens base material to the outermost side of the lens, or the like. A possible combination of a low refractive index layer and a high refractive index layer can be, for example, a combination of a coat including silicon oxide as the principal component and a coat including zirconium oxide as the principal component, and a multilayer film can be, for example, a multilayer film including at least one laminated structure in which the coats of these two layers are adjacent.

Each layer may be a coat including the high refractive index material or the low refractive index material as the principal component. Here, the principal component is a component which accounts for the largest part of the coat and usually accounts for approximately 50 to 100 mass %, or even 90 to 100 mass %. Such a coat can be formed by the film formation using the film forming material including the above material (for example, a vapor deposition source) as the principal component. Note that the principal component of the film forming material is the same as the above. The coat and the film forming material can include a minute amount of impurities which are inevitably mixed, and may include another component such as another inorganic substance or a known additive component which supports the film formation as long as the component does not degrade the function of the principal component. The film formation can be performed by a known film formation method, for example vapor deposition from the perspective of ease of the film formation. The vapor deposition in the present disclosure includes a dry method such as a vacuum vapor deposition method, an ion plating method, or a sputtering method. In the vacuum vapor deposition method, an ion beam assist method in which an ion beam is applied concurrently to vapor deposition may be used.

The multilayer film may also include, in addition to the above high refractive index layer and low refractive index layer, a coat including conductive oxide as the principal component, may be one or more conductive oxide layers formed by vapor deposition using a vapor deposition source including conductive oxide as the principal component in an arbitrary position in the multilayer film. Indium oxide, tin oxide, zinc oxide, titania, or composite oxide thereof which is known as transparent conductive oxide may be used as the conductive oxide from the perspective of transparency of the spectacle lens. The conductive oxide from the perspective of transparency and conductivity can be tin oxide or indium-tin oxide (ITO). By including the conductive oxide layer, it is possible to prevent adherence of dust to the charged spectacle lens.

Furthermore, a functional film may be further formed on the multilayer film. The functional film can be various functional films of a water repellent or hydrophilic antifouling film, an anti-fogging film, a polarizing film, a dimming film, or the like. Any known techniques can be applied to the functional films without any restriction.

The above described spectacle lens of the present disclosure can effectively suppress the entering of the blue light which burdens the eyes to the eyes, and provide a good wearing feeling. Furthermore, according to the present disclosure, it is possible to provide spectacles including such a spectacle lens and a frame equipped with the spectacle lens. Any known techniques can be applied to a structure of the spectacles without any restriction.

EXAMPLES

The present disclosure is described in detail by Examples below, but is not limited to the aspects described by Examples.

Examples 1 to 8

On a hard coat surface on a convex surface side (object side) of a plastic lens base material (clear lens), each surface of which was optically finished and subjected to hard coating in advance in which the object-side surface was a convex surface and the eyeball-side surface was a concave surface, a multilayer vapor deposition film having eight layers in total was sequentially formed by ion assisted deposition using oxygen gas and nitrogen gas as assist gas.

On the hard coat surface on the concave surface side (eyeball side), a multilayer vapor deposition film having eight layers in total was laminated by the ion assisted deposition under the same condition, and a spectacle lens was thus obtained.

In Examples 1 to 8, the multilayer vapor deposition film was formed such that, on each side of the convex surface side and the concave surface side, the first layer, the second layer . . . were laminated in this order from the lens base material side (hard coat side) to the spectacle lens surface and the outermost layer on the spectacle lens surface side was to be the eighth layer using the vapor deposition sources shown in Table 1. In Examples, the normal incidence mean reflectances $R_{eye}$ and $R_{object}$ were controlled by changing the film thickness of one or more layers constituting the multilayer vapor deposition film using the vapor deposition sources consisting of oxide shown in Table 1 except for impurities which can be inevitably mixed.

TABLE 1

|  | Vapor deposition source |
| --- | --- |
| First layer | $SiO_2$ |
| Second layer | $ZrO_2$ |
| Third layer | $SiO_2$ |
| Fourth layer | $ZrO_2$ |
| Fifth layer | $SiO_2$ |
| Sixth layer | $ZrO_2$ |
| Seventh layer | ITO |
| Eighth layer | $SiO_2$ |

Examples 9 to 21 and Comparative Example 1

On a hard coat surface on a convex surface side (object side) of a plastic lens base material (clear lens), each surface of which was optically finished and subjected to hard coating in advance in which the object-side surface was a convex surface and the eyeball-side surface was a concave surface, a multilayer vapor deposition film having eight layers in total was sequentially formed by ion assisted deposition using oxygen gas and nitrogen gas as assist gas.

On the hard coat surface on the concave surface side (eyeball side), a multilayer vapor deposition film having eight layers in total was laminated by the ion assisted deposition under the same condition, and a spectacle lens was thus obtained.

In Examples 9 to 21 and Comparative Example 1, the multilayer vapor deposition film was formed such that, on each side of the convex surface side and the concave surface side, the first layer, the second layer . . . were laminated in this order from the lens base material side (hard coat side)

to the spectacle lens surface and the outermost layer on the spectacle lens surface side was to be the eighth layer using the vapor deposition sources shown in Table 2 and with the film thickness (physical film thickness) shown in Table 2. In Examples and Comparative Example, the vapor deposition sources consisting of oxide shown in Table 2 except for impurities which can be inevitably mixed were used.

The lens base materials shown in Table 2 have the dioptric powers shown in Table 2: the material having the refractive index 1.60 is product name EYAS manufactured by HOYA Corporation, the material having the refractive index 1.50 is product name HILUX (refractive index 1.50) manufactured by HOYA Corporation, and the material having the refractive index 1.74 is EYVIA manufactured by HOYA Corporation, and a hard coat having the refractive index shown in Table 2 is provided on each surface of the materials.

<Evaluation Method>
1. Measurement of Blue Light Reflective Characteristic ($R_{eye}$, $R_{object}$) and Dominant Wavelength At the optical center of the object-side surface (convex surface side) and the eyeball-side surface (concave surface side) of the manufactured spectacle lens, a normal incidence reflection spectral characteristic in the wavelength range of 380 to 780 nm was measured (measurement pitch: 1 nm) using a micro spectrophotometer USPM manufactured by Olympus corporation. From the measurement results, $R_{eye}$, $R_{object}$ and the dominant wavelength were acquired. Note that, the dominant wavelength means a reflection maximum wavelength in a spectral reflection spectrum showing a normal incidence reflection spectral characteristic in the wavelength range of 380 to 780 nm. The spectacle lens in an aspect of the present disclosure may have the dominant wavelength in the wavelength range of 400 to 500 nm from the perspective of the blue light reflective characteristic.

The results are shown in Table 2.

2. Glare Evaluation

The manufactured spectacle lens was observed from the eyeball side under normal brightness in a room, and the strength of the light reflected by the inside of the object-side surface (glare) was organoleptically evaluated by the eyes of an observer based on the following evaluation criteria. The results are shown in Table 2. As shown in Table 2, it has been confirmed that the spectacle lens in Examples suppressed the occurrence of glare compared to the spectacle lens in Comparative Example.

A++: glare is not observed.
A+: glare is seldom observed (less glare than A)
A: glare is seldom observed.
B: glare is observed
C: glare is observed (more severe than B).
D: glare is remarkably observed.

3. Ghost Evaluation

As described above, the glare evaluated in the above evaluation 2. can be caused by blue light entering the object-side surface of the spectacle lens. On the other hand, a part of the blue light entering the object-side surface of the spectacle lens is reflected by the object-side surface, but apart of the blue light passes through the object-side surface and enters the spectacle lens. Due to multiple reflection of the incident blue light inside the spectacle lens, a phenomenon called ghost in which a wearer of spectacles observes a double image can be caused. In order to improve the wearing feeling of the spectacle lens, it is desirable that occurrence of ghost is suppressed.

Thus, the manufactured spectacle lens was observed at the position of 30 cm from the eyeball side under fluorescent light in a dark room, the generation or degree of ghost (double image) was organoleptically evaluated by the eyes of an observer based on the following evaluation criteria. As shown in Table 2, it has been confirmed that the spectacle lens in Examples suppressed the occurrence of ghost compared to the spectacle lens in Comparative Example. The inventors inferred that the occurrence of ghost was suppressed by imparting a higher blue light reflective characteristic to the eyeball-side surface than the object-side surface.

A: ghost is not or seldom observed.
B: ghost is observed (more severe than A).
C: ghost is remarkably observed.

The above results are shown in Table 2.

TABLE 2

|  | Example 1 | | Example 2 | | Example 3 | | Example 4 | |
| --- | --- | --- | --- | --- | --- | --- | --- | --- |
|  | Object side | Eyeball side | Object side | Eyeball side | Object side | Eyeball side | Object side | Eyeball side |
| Refractive index of base material | 1.60 | | 1.67 | | 1.60 | | 1.60 | |
| Dioptric power of base material | S − 4.00 | | S − 4.00 | | S + 4.00 | | S − 0.00 | |
| Refractive index of hard coat | 1.60 | 1.60 | 1.67 | 1.67 | 1.60 | 1.60 | 1.60 | 1.60 |
| Normal incidence mean reflectance (%) Object side $R_{object}$, Eyeball side $R_{eye}$ | 4.07 | 6.23 | 4.08 | 6.24 | 4.10 | 6.79 | 4.17 | 6.64 |
| Dominant wavelength (nm) | 470.20 | 467.98 | 469.11 | 467.55 | 471.07 | 468.14 | 471.21 | 467.25 |
| Difference of reflectances (%) $R_{eye} - R_{object}$ | 2.16 | | 2.16 | | 2.70 | | 2.48 | |
| Ratio $R_{eye}/R_{object}$ | 1.53 | | 1.53 | | 1.66 | | 1.59 | |
| Glare evaluation | A++ | | A++ | | A++ | | A++ | |
| Ghost evaluation | A | | A | | A | | A | |

TABLE 2-continued

|  | Example 5 | | Example 6 | | Example 7 | | Example 8 | |
| --- | --- | --- | --- | --- | --- | --- | --- | --- |
|  | Object side | Eyeball side | Object side | Eyeball side | Object side | Eyeball side | Object side | Eyeball side |
| Refractive index of base material | 1.60 | | 1.60 | | 1.60 | | 1.60 | |
| Dioptric power of base material | S − 4.00 | | S + 4.00 | | S − 0.00 | | S − 4.00 | |
| Refractive index of hard coat | 1.60 | 1.60 | 1.60 | 1.60 | 1.60 | 1.60 | 1.60 | 1.60 |
| Normal incidence mean reflectance (%) Object side $R_{object}$, Eyeball side $R_{eye}$ | 4.22 | 6.58 | 3.06 | 7.25 | 3.16 | 7.27 | 3.14 | 6.95 |
| Dominant wavelength (nm) | 470.75 | 466.70 | 470.21 | 466.54 | 470.08 | 464.21 | 469.45 | 464.00 |
| Difference of reflectances (%) $R_{eye} - R_{object}$ | 2.37 | | 4.19 | | 4.11 | | 3.82 | |
| Ratio $R_{eye}/R_{object}$ | 1.56 | | 2.37 | | 2.30 | | 2.22 | |
| Glare evaluation | A++ | | A++ | | A++ | | A++ | |
| Ghost evaluation | A | | A | | A | | A | |

|  | Example 9 | | Example 10 | | Example 11 | |
| --- | --- | --- | --- | --- | --- | --- |
|  | Object side | Eyeball side | Object side | Eyeball side | Object side | Eyeball side |
| Refractive index of base material | 1.60 | | 1.60 | | 1.60 | |
| Dioptric power of base material | S − 4.00 | | S − 4.00 | | S − 4.00 | |
| Refractive index of hard coat | 1.60 | 1.60 | 1.60 | 1.60 | 1.60 | 1.60 |
| First layer; $SiO_2$ | 32.1 nm | 32.7 nm | 32.1 nm | 33.6 nm | 32.7 nm | 33.6 nm |
| Second layer; $ZrO_2$ | 8.1 nm | 8.1 nm | 8.1 nm | 9.5 nm | 8.1 nm | 9.5 nm |
| Third layer; $SiO_2$ | 385.6 nm | 383.8 nm | 385.6 nm | 376.6 nm | 383.8 nm | 376.6 nm |
| Fourth layer; $ZrO_2$ | 21.5 nm | 20.1 nm | 21.5 nm | 15.0 nm | 20.1 nm | 15.0 nm |
| Fifth layer; $SiO_2$ | 29.1 nm | 29.3 nm | 29.1 nm | 45.3 nm | 29.3 nm | 45.3 nm |
| Sixth layer; $ZrO_2$ | 55.7 nm | 55.5 nm | 55.7 nm | 54.4 nm | 55.5 nm | 54.4 nm |
| Seventh layer; ITO | 5.0 nm | 5.0 nm | 5.0 nm | 5.0 nm | 5.0 nm | 5.0 nm |
| Eighth layer; $SiO_2$ | 104.3 nm | 105.3 nm | 104.3 nm | 111.8 nm | 105.3 nm | 111.8 nm |
| Normal incidence mean reflectance (%) Object side $R_{object}$, Eyeball side $R_{eye}$ | 3.14 | 4.07 | 3.14 | 10.02 | 4.07 | 10.02 |
| Dominant wavelength (nm) | 469.45 | 470.20 | 469.45 | 466.06 | 470.20 | 466.06 |
| Difference of reflectances (%) $R_{eye} - R_{object}$ | 0.93 | | 6.89 | | 5.96 | |
| Ratio $R_{eye}/R_{object}$ | 1.30 | | 3.20 | | 2.46 | |
| Glare evaluation | A++ | | A+ | | A+ | |
| Ghost evaluation | A | | A | | A | |

|  | Example 12 | | Example 13 | | Example 14 | |
| --- | --- | --- | --- | --- | --- | --- |
|  | Object side | Eyeball side | Object side | Eyeball side | Object side | Eyeball side |
| Refractive index of base material | 1.60 | | 1.60 | | 1.60 | |
| Dioptric power of base material | S − 4.00 | | S − 4.00 | | S − 4.00 | |
| Refractive index of hard coat | 1.60 | 1.60 | 1.60 | 1.60 | 1.60 | 1.60 |
| First layer; $SiO_2$ | 30.2 nm | 33.6 nm | 32.1 nm | 41.1 nm | 32.7 nm | 41.1 nm |
| Second layer; $ZrO_2$ | 8.9 nm | 9.5 nm | 8.1 nm | 10.0 nm | 8.1 nm | 10.0 nm |
| Third layer; $SiO_2$ | 382.6 nm | 376.6 nm | 385.6 nm | 368.6 nm | 383.8 nm | 368.6 nm |
| Fourth layer; $ZrO_2$ | 14.5 nm | 15.0 nm | 21.5 nm | 12.9 nm | 20.1 nm | 12.9 nm |
| Fifth layer; $SiO_2$ | 38.8 nm | 45.3 nm | 29.1 nm | 53.9 nm | 29.3 nm | 53.9 nm |
| Sixth layer; $ZrO_2$ | 44.4 nm | 54.4 nm | 55.7 nm | 54.4 nm | 55.5 nm | 54.4 nm |
| Seventh layer; ITO | 5.0 nm | 5.0 nm | 5.0 nm | 5.0 nm | 5.0 nm | 5.0 nm |
| Eighth layer; $SiO_2$ | 111.9 nm | 111.8 nm | 104.3 nm | 113.8 nm | 105.3 nm | 113.8 nm |
| Normal incidence mean reflectance (%) Object side $R_{object}$, Eyeball side $R_{eye}$ | 6.95 | 10.02 | 3.14 | 15.00 | 4.07 | 15.00 |

TABLE 2-continued

| | | | | | | |
|---|---|---|---|---|---|---|
| Dominant wavelength (nm) | 464.00 | 466.06 | 469.45 | 465.85 | 470.20 | 465.85 |
| Difference of reflectances (%) $R_{eye} - R_{object}$ | | 3.07 | | 11.87 | | 10.94 |
| Ratio $R_{eye}/R_{object}$ | | 1.44 | | 4.78 | | 3.69 |
| Glare evaluation | | A+ | | A | | A |
| Ghost evaluation | | A | | A | | A |

| | Example 15 | | Example 16 | | Example 17 | | Example 18 | |
|---|---|---|---|---|---|---|---|---|
| | Object side | Eyeball side | Object side | Eyeball side | Object side | Eyeball side | Object side | Eyeball side |
| Refractive index of base material | 1.60 | | 1.60 | | 1.60 | | 1.60 | |
| Dioptric power of base material | S − 4.00 | | S − 4.00 | | S − 4.00 | | S − 4.00 | |
| Refractive index of hard coat | 1.60 | 1.60 | 1.60 | 1.60 | 1.60 | 1.60 | 1.60 | 1.60 |
| First layer; SiO$_2$ | 30.2 nm | 41.1 nm | 34.6 nm | 41.1 nm | 32.1 nm | 35.1 nm | 32.7 nm | 35.1 nm |
| Second layer; ZrO$_2$ | 8.9 nm | 10.0 nm | 10.0 nm | 10.0 nm | 8.1 nm | 11.0 nm | 8.1 nm | 11.0 nm |
| Third layer; SiO$_2$ | 382.6 nm | 368.6 nm | 368.6 nm | 368.6 nm | 385.6 nm | 348.6 nm | 383.8 nm | 348.6 nm |
| Fourth layer; ZrO$_2$ | 14.5 nm | 12.9 nm | 13.5 nm | 12.9 nm | 21.5 nm | 12.9 nm | 20.1 nm | 12.9 nm |
| Fifth layer; SiO$_2$ | 38.8 nm | 53.9 nm | 53.3 nm | 53.9 nm | 29.1 nm | 58.1 nm | 29.3 nm | 58.1 nm |
| Sixth layer; ZrO$_2$ | 44.4 nm | 54.4 nm | 54.4 nm | 54.4 nm | 55.7 nm | 55.9 nm | 55.5 nm | 55.9 nm |
| Seventh layer; ITO | 5.0 nm | 5.0 nm | 5.0 nm | 5.0 nm | 5.0 nm | 5.0 nm | 5.0 nm | 5.0 nm |
| Eighth layer SiO$_2$ | 111.9 nm | 113.8 nm | 113.8 nm | 113.8 nm | 104.3 nm | 115.8 nm | 105.3 nm | 115.8 nm |
| Normal incidence mean reflectance (%) Object side $R_{object}$, Eyeball side $R_{eye}$ | 6.95 | 15.00 | 14.05 | 15.00 | 3.14 | 20.16 | 4.07 | 20.16 |
| Dominant wavelength (nm) | 464.00 | 465.85 | 466.57 | 465.85 | 469.45 | 465.13 | 470.20 | 465.13 |
| Difference of reflectances (%) $R_{eye} - R_{object}$ | | 8.05 | | 0.95 | | 17.03 | | 16.09 |
| Ratio $R_{eye}/R_{object}$ | | 2.16 | | 1.07 | | 6.43 | | 4.96 |
| Glare evaluation | | A | | A | | A | | A |
| Ghost evaluation | | A | | A | | A | | A |

| | Example 19 | | Example 20 | | Example 21 | | Comparative Example 1 | |
|---|---|---|---|---|---|---|---|---|
| | Object side | Eyeball side | Object side | Eyeball side | Object side | Eyeball side | Object side | Eyeball side |
| Refractive index of base material | 1.60 | | 1.50 | | 1.74 | | 1.60 | |
| Dioptric power of base material | S − 4.00 | | S − 4.00 | | S − 4.00 | | S − 4.00 | |
| Refractive index of hard coat | 1.60 | 1.60 | 1.50 | 1.50 | 1.74 | 1.74 | 1.60 | 1.60 |
| First layer; SiO$_2$ | 41.1 nm | 35.1 nm | 29.9 nm | 31.6 nm | 29.7 nm | 26.3 nm | 29.6 nm | 32.7 nm |
| Second layer; ZrO$_2$ | 10.0 nm | 11.0 nm | 5.4 nm | 4.7 nm | 10.5 nm | 10.4 nm | 8.5 nm | 8.1 nm |
| Third layer; SiO$_2$ | 368.6 nm | 348.6 nm | 385.9 nm | 384.6 nm | 378.2 nm | 376.8 nm | 384.6 nm | 383.8 nm |
| Fourth layer; ZrO$_2$ | 12.9 nm | 12.9 nm | 19.5 nm | 16.9 nm | 20.8 nm | 16.9 nm | 16.0 nm | 20.1 nm |
| Fifth layer; SiO$_2$ | 53.9 nm | 58.1 nm | 33.1 nm | 34.1 nm | 28.8 nm | 35.8 nm | 36.3 nm | 29.3 nm |
| Sixth layer; ZrO$_2$ | 54.4 nm | 55.9 nm | 49.1 nm | 48.7 nm | 57.5 nm | 45.5 nm | 44.4 nm | 55.5 nm |
| Seventh layer; ITO | 5.0 nm | 5.0 nm | 5.0 nm | 5.0 nm | 5.0 nm | 5.0 nm | 5.0 nm | 5.0 nm |
| Eighth layer SiO$_2$ | 113.8 nm | 115.8 nm | 107.7 nm | 110.1 nm | 105.1 nm | 112.0 nm | 111.9 nm | 105.3 nm |
| Normal incidence mean reflectance (%) Object side $R_{object}$, Eyeball side $R_{eye}$ | 15.00 | 20.16 | 4.08 | 6.02 | 3.85 | 6.11 | 5.13 | 4.83 |
| Dominant wavelength (nm) | 465.85 | 465.13 | 462.96 | 464.57 | 466.47 | 466.07 | 465.93 | 467.37 |
| Difference of reflectances (%) $R_{eye} - R_{object}$ | | 5.16 | | 1.94 | | 2.26 | | −0.30 |

TABLE 2-continued

| Ratio $R_{eye}/R_{object}$ | 1.34 | 1.48 | 1.59 | 0.94 |
|---|---|---|---|---|
| Glare evaluation | A | $A^{++}$ | $A^{++}$ | C |
| Ghost evaluation | A | A | A | C |

Lastly, the above aspects are summarized.

According to an aspect, it is possible to provide a spectacle lens including a lens base material and a multilayer film provided on each surface of an eyeball-side surface and an object-side surface of the lens base material, in which a normal incidence mean reflectance $R_{eye}$ in a wavelength range of 430 to 450 nm measured on the eyeball-side surface of the spectacle lens and a normal incidence mean reflectance $R_{object}$ in a wavelength range of 430 to 450 nm measured on the object-side surface of the spectacle lens each are more than 0%, and $R_{eye}$ is greater than $R_{object}$.

According to an aspect, it is possible to provide spectacles including the spectacle lens and a frame equipped with the spectacle lens.

The spectacle lens is a spectacle lens in which a higher blue light reflective characteristic is imparted to the eyeball-side surface than the object-side surface in the above manner, and can mitigate the burden of blue light on eyes and provide a wearing feeling to a wearer wearing spectacles equipped with the spectacle lens.

In an aspect, $R_{eye}$ and $R_{object}$ each are in a range of 2.00 to 21.00%, and $R_{eye}$ is greater than $R_{object}$.

In an aspect, from the perspective of a better wearing feeling, $R_{eye}$ and $R_{object}$ each are in a range of 2.00 to 10.00%, and $R_{eye}$ is greater than $R_{object}$.

In an aspect, the difference between $R_{eye}$ and $R_{object}$ ($R_{eye}-R_{object}$) is equal to or more than 0.90%.

In an aspect, the ratio of $R_{eye}$ to $R_{object}$ ($R_{eye}/R_{object}$) is in a range of more than 1.00 and less than or equal to 6.50.

In an aspect, the multilayer film is a multilayer film in which a plurality of coats including an inorganic material as a principal component is laminated.

In an aspect, the multilayer film includes at least one laminated structure in which a coat including silicon oxide as a principal component and a coat including zirconium oxide as a principal component are adjacent.

In an aspect, the multilayer film includes at least one layer of a coat including conductive oxide as a principal component.

In an aspect, the coat is a vapor deposition film.

In an aspect, the spectacle lens includes, on the lens base material through at least a hard coat layer, at least either of the multilayer film on the eyeball-side surface or the multilayer film on the object-side surface of the lens base material.

The embodiment disclosed herein is an example in every respect and should not be restrictively understood. The scope of the present disclosure is described not by the above description but by claims, and includes all modifications equivalent to and in claims.

The present disclosure is useful in the field of manufacturing spectacle lenses and spectacles.

The invention claimed is:

1. A spectacle lens comprising:
 a lens base material; and
 a multilayer film provided on each surface of an eyeball-side surface and an object-side surface of the lens base material, wherein
 the spectacle lens has a normal incidence mean reflectance $R_{eye}$ in a wavelength range of 430 to 450 nm measured on the eyeball-side surface of the spectacle lens and a normal incidence mean reflectance $R_{object}$ in a wavelength range of 430 to 450 nm measured on the object-side surface of the spectacle lens that satisfy the following relationships:
 $R_{object}$ is greater than or equal to 3.06%; and
 the ratio of $R_{eye}$ to $R_{object}$ ($R_{eye}/R_{object}$) is in a range of more than 1.00 and less than or equal to 2.37.

2. The spectacle lens according to claim 1, wherein the spectacle lens includes, on the lens base material through at least a hard coat layer, at least either of the multilayer film on the eyeball-side surface or the multilayer film on the object-side surface of the lens base material.

3. Spectacles comprising:
 a spectacle lens according to claim 1; and
 a frame equipped with the spectacle lens.

4. The spectacle lens according to claim 1, wherein the object-side surface is a convex surface and the eyeball-side surface is a concave surface.

5. The spectacle lens according to claim 1, wherein the multilayer film is a multilayer film in which a plurality of coats including an inorganic material as a principal component is laminated.

6. The spectacle lens according to claim 5, wherein the multilayer film includes at least one laminated structure in which a coat including silicon oxide as a principal component and a coat including zirconium oxide as a principal component are adjacent.

7. The spectacle lens according to claim 5, wherein the coat is a vapor deposition film.

8. The spectacle lens according to claim 5, wherein the multilayer film includes at least one layer of a coat including conductive oxide as a principal component.

9. The spectacle lens according to claim 8, wherein the conductive oxide is tin oxide and/or indium-tin oxide.

* * * * *